UNITED STATES PATENT OFFICE.

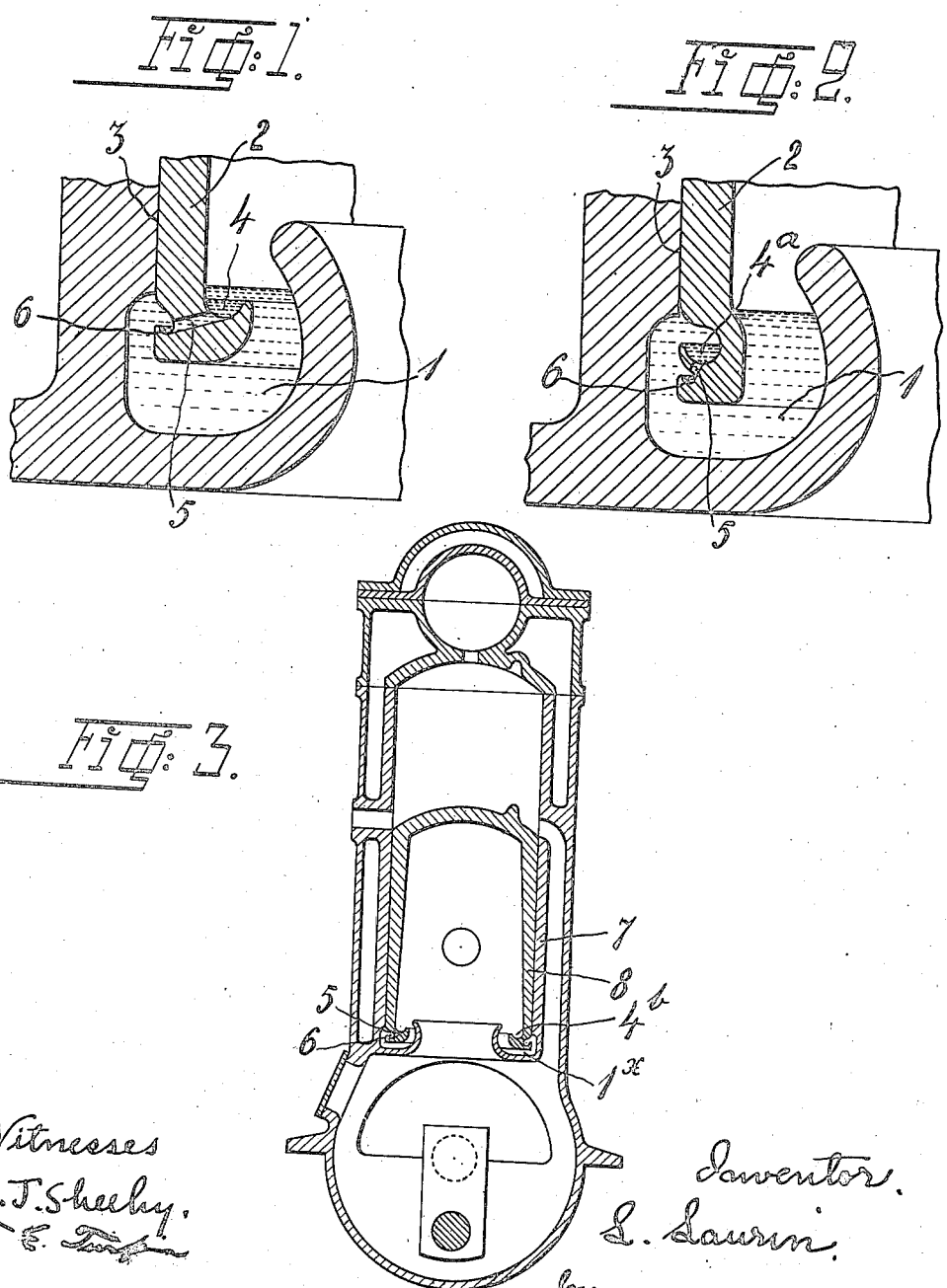

LAURENTIUS LAURIN, OF LYSEKIL, SWEDEN.

LUBRICATION MEANS.

1,194,644.

Specification of Letters Patent.  Patented Aug. 15, 1916.

Application filed May 12, 1915. Serial No. 27,705.

*To all whom it may concern:*

Be it known that I, LAURENTIUS LAURIN, a citizen of the Kingdom of Sweden, residing at Lysekil, Sweden, have invented new and useful Improvements in Lubrication Means, of which the following is a specification.

This invention relates to an improvement in means for lubricating up and down movable members of engines, machines and the like.

It has already been proposed in order to save lubricant in lubricating up and down movable members of engines or the like to provide a stationary lubricant receiver in such a manner in relation to the member to be lubricated that the latter in its lowermost position enters into the said receiver and into the lubricant contained therein, the lubricant dripping down from the movable member during the upward movement thereof being collected in said receiver. Such a method of lubricating is, however, unsatisfactory, in as much as the quantity of lubricant adhering to the friction surfaces of the movable member when the latter leaves the receiver is in many cases too small.

The object of the invention is to render the movable member capable of carrying with each time it leaves the said receiver a quantity of lubricant sufficient to lubricate the friction surfaces during the whole of or any desired part of the stroke of the movable member.

The invention consists chiefly in that the up and down movable member is formed with an oil catcher, adapted to enter the said lubricant receiver, and with passages or channels leading from said oil catcher to the surfaces to be lubricated.

In the accompanying drawing Figures 1 and 2 show each one embodiment of the invention in sectional views. Fig. 3 illustrates the application of the invention to an internal combustion engine.

Referring to Fig. 1, 1 designates a stationary receiver for instance of annular shape and adapted to contain a liquid lubricant. 2 is an engine or machine member of a corresponding annular form reciprocating up and down and shown on the drawing in its lowermost position. 3 designates the friction surfaces to be lubricated. The member 2 is at the side opposite to the friction surfaces 3 formed with an oil catcher, consisting, for instance, of an annular, recessed flange 4 the cavity of which is connected through one or more passages or channels 5 with a cup-shaped, annular recess 6 situated at the same side of the member 2 as the friction surfaces 3 and on a lower level than the cavity of the flange 4, said recess 6 opening toward the friction surfaces 3. In the lowermost position of the member 2 the cavity of the flange 4 is immersed in the lubricant contained in the receiver 1 and, will on account thereof, be filled with lubricant. During the upward movement of the member 2 the lubricant contained in the recess 6 is wiped off at the lower edge of said recess 6 while new oil is supplied from the cavity 4, as long as there is any lubricant in the latter. During the downward movement of the member 2 the lubricant thus delivered from the recess 6 will be utilized.

In the embodiment of the invention shown in Fig. 2 a recess $4^a$ is formed in the member 2 at the same side as the recess 6.

Fig. 3 shows the invention as applied to an internal combustion engine. At the lower end the engine cylinder 7 is formed with an annular recessed flange $1^x$ collecting the lubricant dripping from the piston 8. At the lower end the piston 8 is formed with a recessed flange $4^b$ placed at the inner side of the piston and connected through one or more sloping passages or channels 5 with a recess 6 arranged in the piston 8 in the same manner as is shown in Fig. 1. The size of the cavity 4 or the recesses $4^a$ and $4^b$ is such that the quantity of lubricant caught by the same, every time the said cavity or recesses is or are immersed in the lubricant contained in the receiver 1, is sufficient for lubricating the friction surfaces of the cylinder 7 and the piston 8 during the whole stroke of the piston or, if desired, any part of said stroke.

Having now described my invention, what I claim as new and desire to secure by Letters Patent is:

In lubricating means of the kind described, the combination of a member having an oil receptacle, and a member constructed and arranged to be reciprocated relative to the first-named member and having an oil catcher movable into and out of the oil receptacle of the first-named member and also having a port leading from said oil catcher to the surface of the reciprocatory member that is to be lubricated.

In testimony that I claim the foregoing as my invention, I have signed my name in presence of two subscribing witnesses.

LAURENTIUS LAURIN.